Nov. 21, 1939.  J. GASPARI  2,180,820
OPHTHALMIC MOUNTING
Filed May 17, 1938
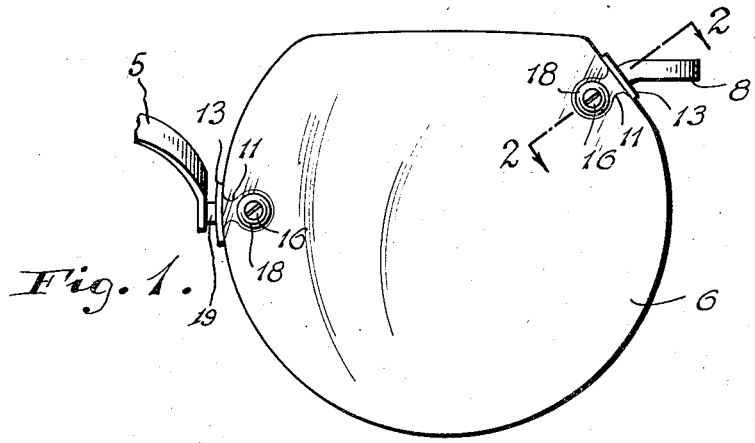
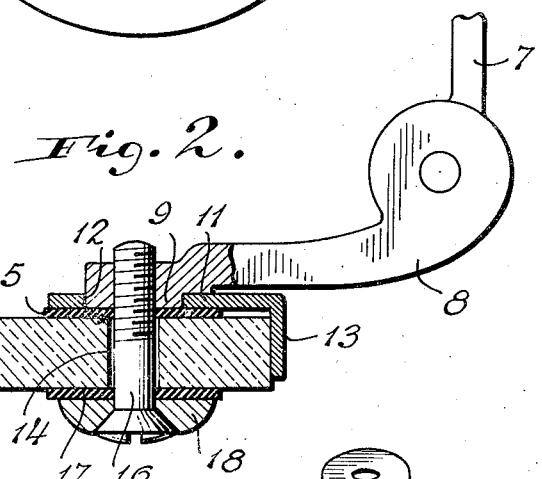
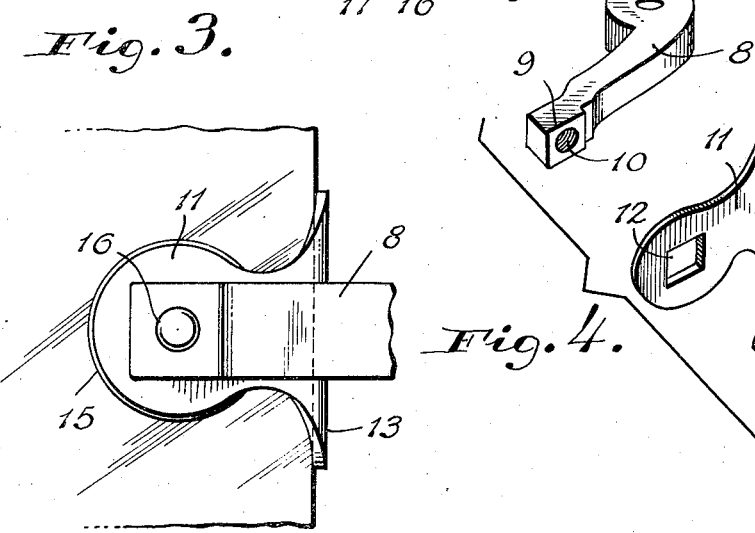
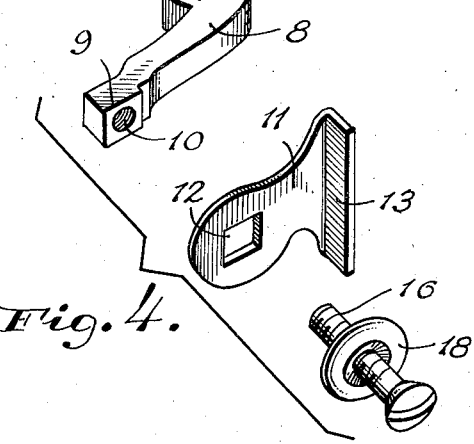
INVENTOR.
JOSEPH GASPARI
BY Fritz Ziegler
ATTORNEY.

Patented Nov. 21, 1939

2,180,820

UNITED STATES PATENT OFFICE 2,180,820

OPHTHALMIC MOUNTING

Joseph Gaspari, Harrison, N. Y., assignor to J. Gaspari & Co., Inc., New York, N. Y., a corporation of New York Application May 17, 1938, Serial No. 208,335

1 Claim. (Cl. 88—47)

This invention relates to improvements in ophthalmic mountings and has for one of its objects to provide an improved mounting of simple and practical construction and of unusual strength and rigidity, and wherein there is avoided the use of the customary lens straps which straddle the lens, and the practice of employing solder for securing together parts of the mounting.

A further and more specific object is to connect either the end pieces of the bridge or the temples to the lenses by a mounting in which a supporting element and a mounting plate are provided with cooperating means that are so interengaged as to prevent any relative axial turning movement between the same, and are rigidly secured to each other and to the lenses by a fastener which extends through said lenses and supporting element.

The above and other objects will appear more clearly from the following detailed description when taken in connection with the accompanying drawing, the limits of the invention being defined by the appended claim.

In the drawing—

Figure 1 is a fragmentary front elevation showing the improved mounting applied to one of the lenses of a pair of eyeglasses.

Figure 2 is an enlarged section taken substantially on the line 2—2 of Fig. 1.

Figure 3 is a fragmentary rear elevation of a part of the mounting, and,

Figure 4 is a perspective view of a portion of the mounting with elements thereof separated from each other.

The invention is shown in its application to a pair of eyeglasses of the rimless type wherein there is employed a bridge 5 for connecting a pair of lenses one of which is shown at 6, and a temple 7 for each lens, the bridge and temple being each connected to the lens 6 by a mounting embodying the essential features of the inventive idea.

Referring more particularly to the portion of the mounting utilized to connect each temple 7 to the lens 6 as best illustrated in Figs. 2 to 4, the mounting is shown as comprising a rearwardly curved supporting arm or end piece 8 to the rear end of which is pivotally connected, in the usual manner, the forward end of the temple 7. The opposite end of the arm 8 terminates in a head 9 of non-circular formation which constitutes a forwardly extending projection the purpose of which will presently appear, and said head is provided therethrough with a screw threaded opening 10.

Associated with the supporting element 8, and more particularly the projection 9 thereof, is a mounting plate 11 the main portion of which is substantially circular in formation and provided in the center thereof with an opening 12 of the same configuration as the projection 9 and of substantially the same size thereof so that said projection will fit snugly into said opening when the supporting element and mounting plate are secured together so that there will be no relative axial turning movement between said members. When the latter are thus associated and the mounting is attached to the lens, as will presently appear, the supporting arm 8 will project laterally from the edge of the lens 6 to which the mounting is secured and will be disposed in a horizontal plane. At one end of the plate 11 the same is widened and projecting forwardly from said end is a laterally extending flange 13 which may be curved, when necessary, longitudinally to conform to the contour of the marginal edge of the lens at the point where the mounting is attached. Preferably, the width of the extension or flange 13 is less than the thickness of any lens to which the mounting plate is secured so that the free forward edge of said flange will terminate short of the outer surface of the lens and therefore will not extend over said surface. With such a formation of the flange, it will be apparent that the mounting plate may be attached to lenses of various thicknesses without altering the formation of the plate, and that the necessity is avoided of utilizing ordinary lens straps which straddle the edge of the lens and engage both surfaces thereof.

Before application of the mounting to the lens 6 the latter is formed, adjacent the edge to which the mounting is to be attached, with a transverse opening 14. The mounting plate 11 may be then applied in the position shown in Fig. 2 with an apertured disc 15 of celluloid or any other suitable material interposed between the plate and the rear surface of the lens. With the flange 13 of the plate engaged with the marginal edge of the lens, the opening 12 in said plate will be registered with the opening 14 in the lens, and the projection 9 of the supporting arm 8 may then be inserted into said opening 12 preparatory to securing the parts together. This latter operation is preferably accomplished by means of a screw 16 of slightly less diameter than the opening 14 in the lens and of a length sufficient to extend completely through the lens and also through the screw threaded opening 10 in the projection 9 of the supporting element 8. A disc 17 similar to the disc 15 may be placed upon the headed end of the screw 16 in engagement with the washer 18 thereon so that said disc will engage the front surface of the lens when the screw 16 is threaded into position by insertion through the opening 14 and its subsequent threading into the opening 10 until the various parts are finally secured together by said screw.

For the attachment of the bridge 5 to the lens 6 at either end of the bridge, the same type of mounting as above described may be employed, each end of the bridge being provided with a supporting arm 19 which may form an integral part of the bridge 5 where it joins the latter at the inner end of the arm, while the other extremity of said arm is provided with a projection similar to the head 9 of the supporting element 8.

What is claimed is:

In an ophthalmic mounting, the combination of a lens, a mounting plate having a flat portion extending along only the rear surface of the lens and provided therein with an opening, said plate further having a forwardly projecting lateral flange engaging the rim of said lens with the entire forward endge of said flange terminating short of the front surface of said lens, a supporting element having a projection of a thickness equal to that of said plate and extending into the opening in the latter, said projection and opening being of a formation to prevent relative turning movements between said plate and supporting element, and a fastener extending through said lens and engaging in said projection for securing the lens to said supporting element.

JOSEPH GASPARI.